United States Patent [19]
Lin

[11] Patent Number: 5,232,230
[45] Date of Patent: Aug. 3, 1993

[54] CHUCK ASSEMBLY FOR A DRILLING APPARATUS

[76] Inventor: Pi-Chu Lin, No. 157-8, Hu-Tzu Nei, Hu-Nei Li Chia-Yi, Taiwan

[21] Appl. No.: 952,387

[22] Filed: Sep. 28, 1992

[51] Int. Cl.$^5$ .............................................. B23B 31/10
[52] U.S. Cl. ...................................... 279/62; 279/902
[58] Field of Search ................... 279/60, 61, 62, 64, 279/902

[56] References Cited

U.S. PATENT DOCUMENTS 3,970,323  7/1979  Schnizler, Jr. .................... 279/64
4,302,021 11/1981  Röhm ............................... 279/64 X
5,031,925  7/1991  Tatsu et al. ...................... 279/902 X Primary Examiner—Timothy V. Eley
Attorney, Agent, or Firm—Panitch, Schwarze, Jacobs & Nadel

[57] ABSTRACT

The chuck assembly is to be incorporated in a drilling apparatus and includes a chuck body which defines an axial through bore to receive a drill bit therein. A pawl and ratchet mechanism is operated to move an enclosed clamp member which is rotatably provided in an annular recess that is formed on an external surface of the chuck body.

2 Claims, 8 Drawing Sheets

CHUCK ASSEMBLY FOR A DRILLING APPARATUS

BACKGROUND OF THE INVENTION

1. Field of Invention

The invention relates to a drilling apparatus, more particularly to a drilling apparatus which includes a chuck assembly for holding a drill bit and which chuck assembly includes a pawl and ratchet mechanism provided therein so that the chuck assembly does not require a chuck key when fixing the drill bit therein.

2. Description of the Related Art

Referring to FIGS. 1 and 2, a drilling apparatus is shown to comprise a cylindrical chuck body (11) having an axial through bore (111) extending therethrough, which through bore (111) has a front portion to receive a section of an inserted drill bit (2) therein, an annular recess (113) with two opposed side walls formed on an external surface of the chuck body (11) and an outwardly extending flange formed on the chuck body (11) and having a front face which is flushed with the rear side wall of the annular recess (113). A pair of clamping units (12), which cooperatively define an enclosed clamp member, are rotatably provided on the annular recess (113). The enclosed clamp member has an engaging teeth (122) formed on the periphery thereof. The engaging teeth (122) are exposed when the enclosed clamp member is disposed in the annular recess (113). The enclosed clamp member (12) further includes an inclined inner wall provided with an internal screw thread (121) thereon. The enclosed clamp member (12) and the outwardly extending flange (16) and a section of the external surface of the chuck body (11) cooperatively define an annular clearance thereamong. The chuck body (11) further includes a retaining hole (112) formed therein adjacent to said enclosed clamp member and a plurality of through holes (114), each of said through holes (114) being inclined relative to the axial through bore (111) of the chuck body (11). The inclined through holes (114) pass through the outwardly extending flange (16), the annular clearance, the enclosed clamp member (12) and extend into the axial through bore (111) of the chuck body (11). A plurality of elongated clamping pieces (13) are received in a respective one of the through holes (114). Each of the clamping pieces (13) has an abutting side provided with a rack teeth (131), which meshes with internal thread (121) of the enclosed clamp member (12), and a clamping face (132), which is disposed in the axial through bore (111) adjacent to the drill bit (2). A retaining unit (14) is sleeved on the chuck body (11) and is securely connected to the enclosed clamp member (12).

When in use, the enclosed clamp member (12) is rotated by a chuck key (3). The chuck key (3) includes a positioning rod (31), which can be inserted into the retaining hole (112) of the chuck body (11), and a teethed wheel (32), which meshes with the engaging teeth (122) of the enclosed clamp member (12). When the chuck key (3) is rotated in a first direction, the enclosed clamp member (12) also rotates in the first direction, thereby moving the clamping pieces (13) interiorly of the axial bore (111) so as to clamp the drill bit (2). To release the drill bit, the enclosed clamp member (12) is rotated in a second direction opposite to the first direction, wherein the clamping pieces (13) moves exteriorly in the axial bore (111) of the chuck body (11).

Some drawbacks of the conventional drilling apparatus are as follow:

(1) Since there is no other means to prevent the enclosed clamp member (12) from rotating in the second direction, the drilling bit (2) may loosen due to the presence of a continuous vibrating action during the drilling operation.

(2) A chuck Key (3) is used to rotate the chuck body (11) so as to clamp the drill bit (2). The chuck key (3) may sometimes be misplaced, and without the chuck key (3), the chuck body (11) cannot be rotated.

SUMMARY OF THE INVENTION

The principal objective of the present invention is to provide a chuck assembly to be incorporated in a drilling apparatus that includes a chuck body for holding a drill bit which chuck body does not require a chuck key to rotate the same when fixing the drill bit.

Another objective of the present invention is to provide a chuck assembly which includes a chuck body that firmly clamps an inserted drill bit and a pawl and ratchet mechanism which prevents the chuck body from rotating to a loosening direction such that the drill bit is not loosened due to the presence of a continuous vibrating action during the drilling operation.

According to the present invention, a pawl and ratchet mechanism is fixed on the chuck body of the conventional chuck assembly in a drilling apparatus such that the improved drilling apparatus does not require a chuck key to rotate the chuck body when a drill bit is fixed therein. Since the pawl and ratchet mechanism does not permit the chuck body to rotate in a loosening direction, loosening of the drill bit in the chuck body during the drilling operation can be avoided.

BRIEF DESCRIPTION OF THE DRAWINGS

Other features and advantages of the present invention will become more apparent in the following detailed description, including drawing, all of which show a non-limiting form of the invention, and in which.

DETAILED DESCRIPTION OF THE PREFERRED EMBODIMENTS

Figure 1:
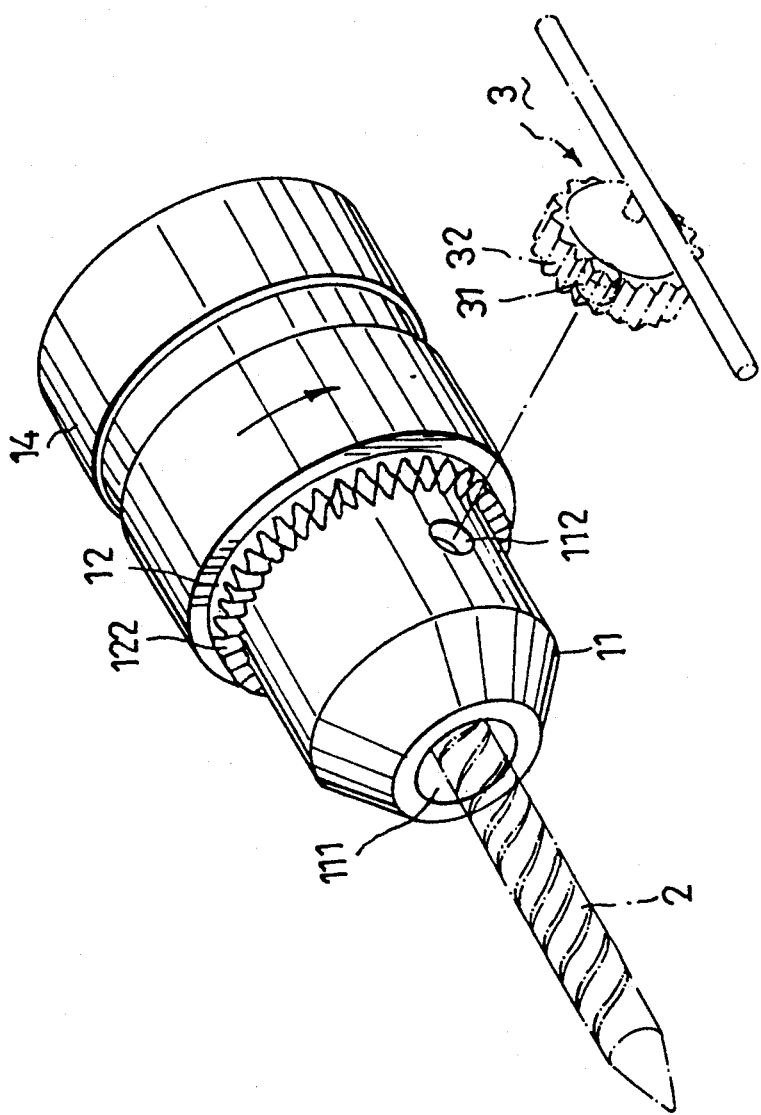
FIG. 1 shows a perspective, schematic view of a conventional chuck assembly of a drilling apparatus.
Figure 2:
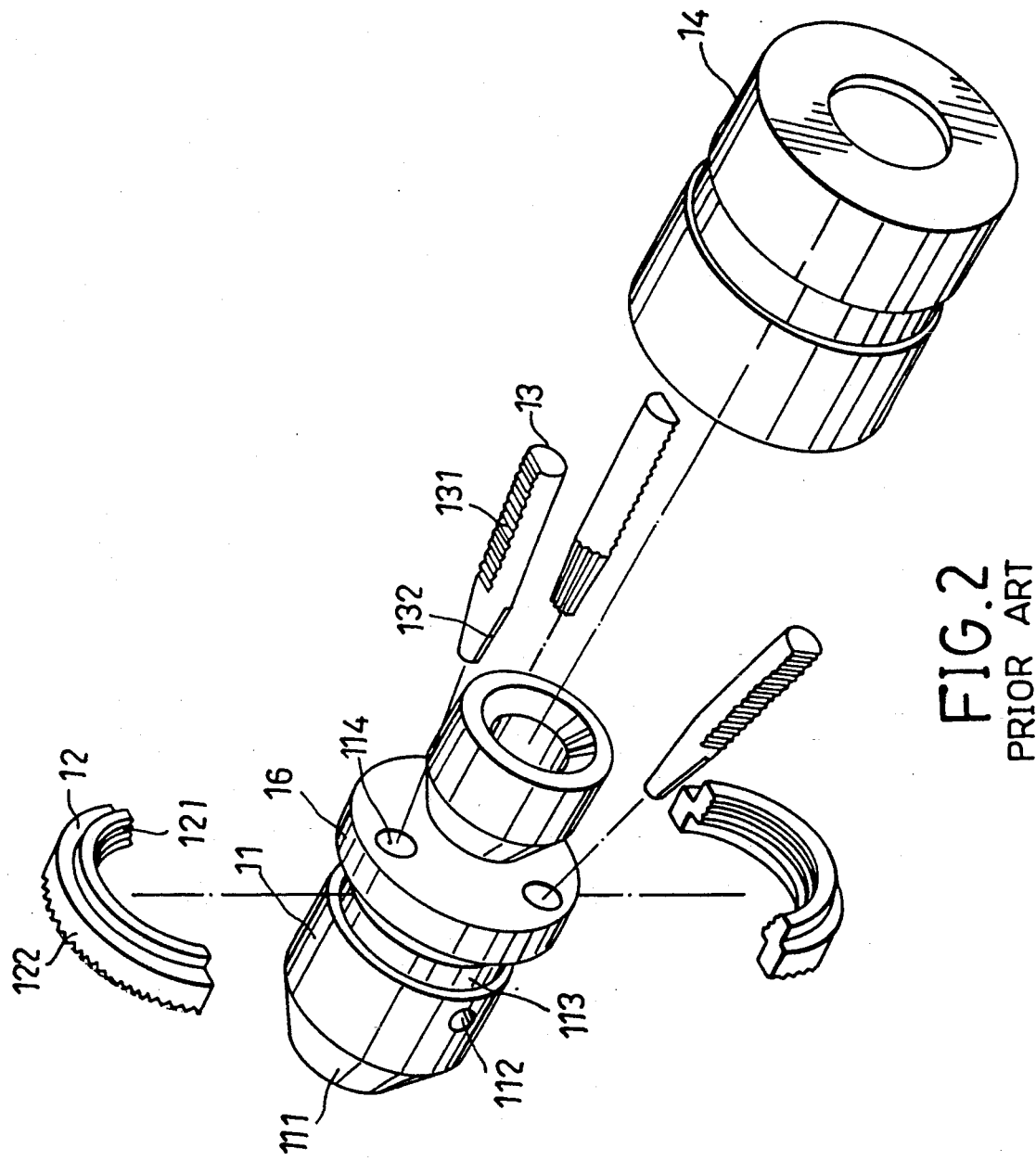
FIG. 2 is an exploded view of the conventional chuck assembly shown in FIG. 1.
Figure 3:
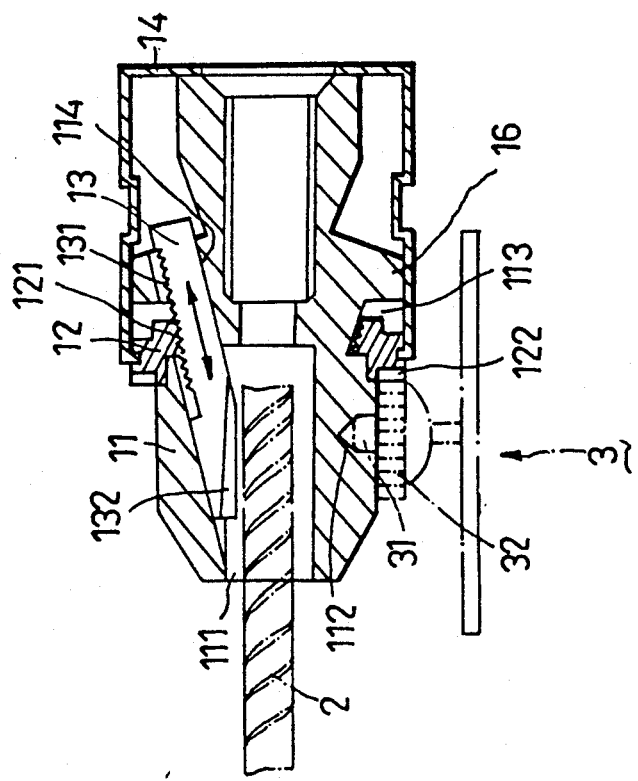
FIG. 3 shows a cross sectional view of the conventional chuck assembly of FIG. 1.
Figure 4:
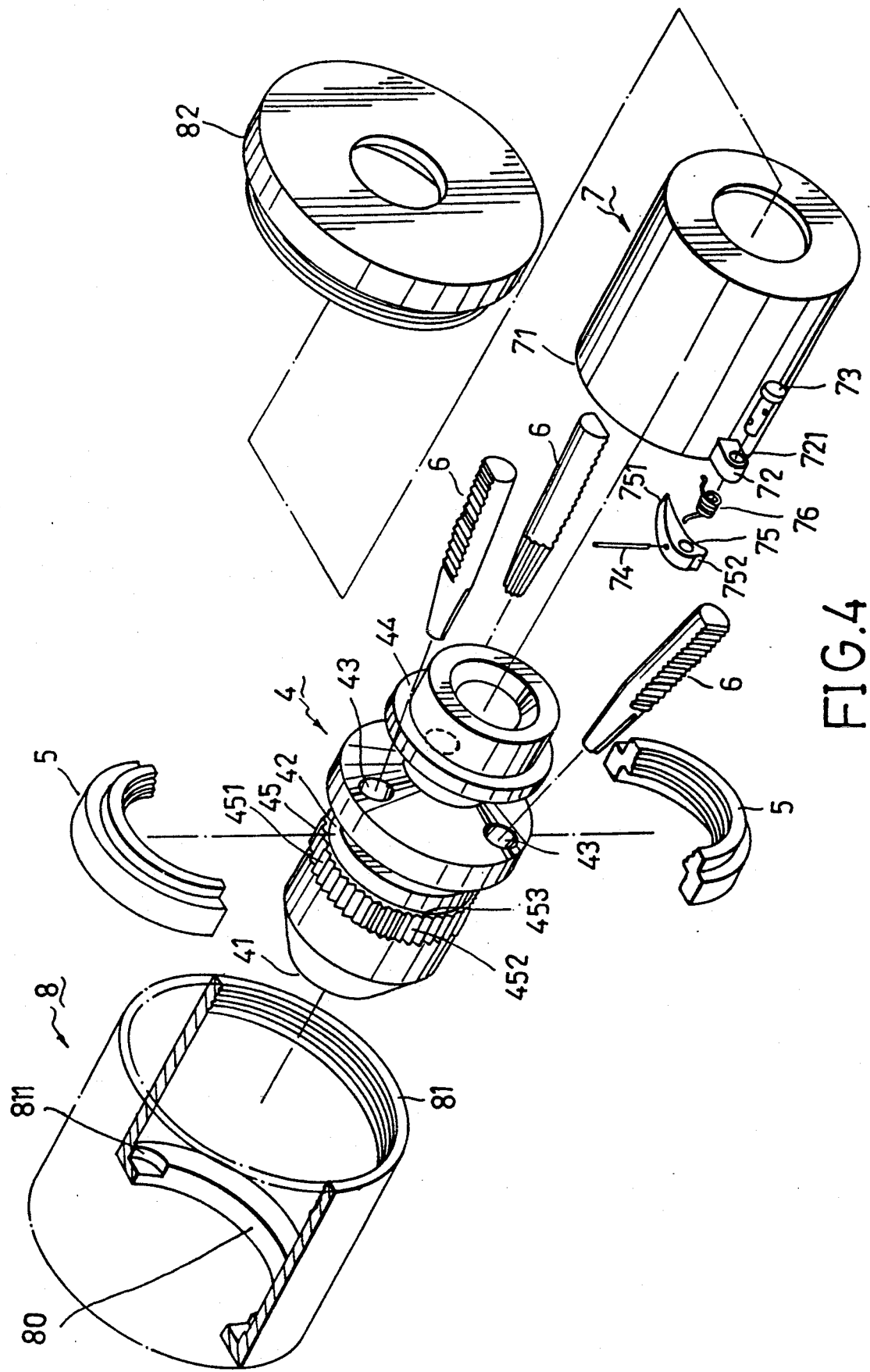
FIG. 4 shows an exploded view of a chuck assembly of the present invention.
Figure 5:
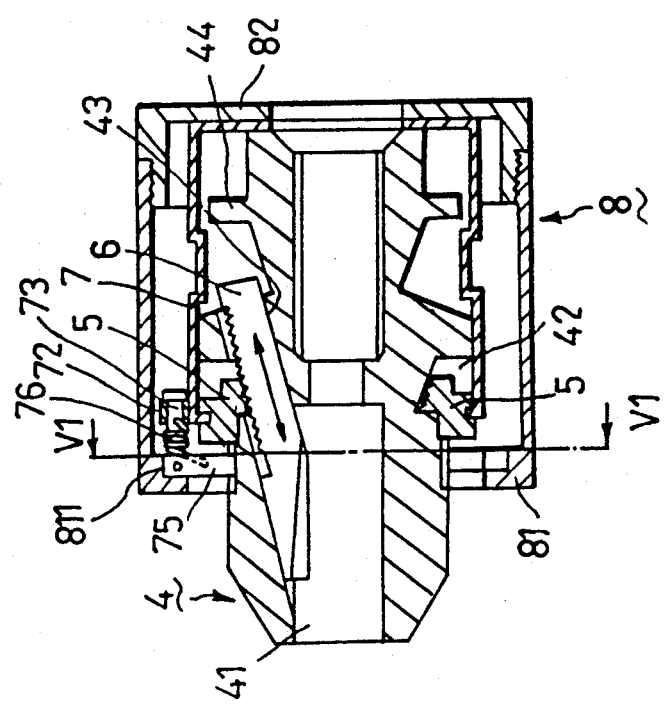
FIG. 5 is a cross sectional view of the chuck assembly shown in FIG. 4.
Figure 6:
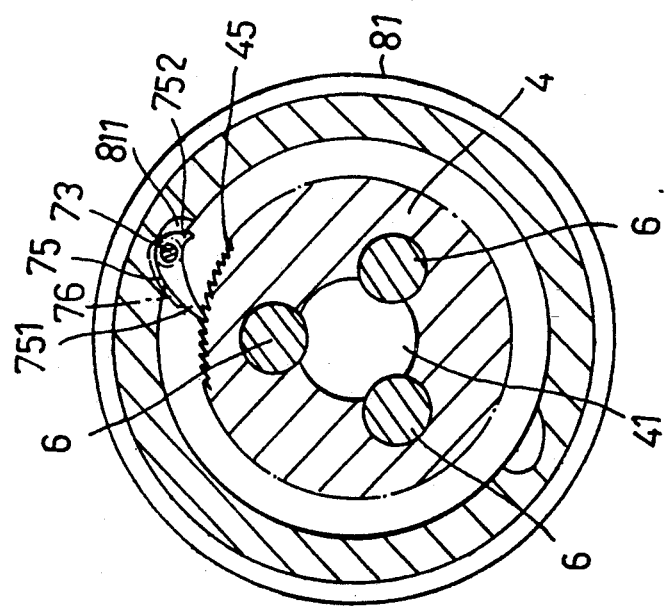
FIG. 6 shows a cross sectional view of the chuck assembly taken along the line VI—VI in FIG. 5.

The generally construction of the chuck assembly (4) according to the present invention is similar to that disclosed in the prior art. Only a portion of the chuck assembly is modified such that the modified chuck assembly includes a chuck body (4) which does not require a chuck key to rotate the chuck body (4) when inserting or removing a drill bit therefrom.

According to the present invention, a tubular member (7) is sleeved over the chuck body (4). The tubular member (7) has an annular flange formed at one end (71) thereof that extends radially inwardly and that is connected securely to the enclosed clamp member (5), thereby retaining the enclosed clamp member (5) on the chuck body (4). The tubular member (7) has a stud (72) with a through hole (721) to receive a locking bolt (73). An actuate pawl member (75) is sleeved on and is pivotally held on the bolt (73) by a pin (74). A coil spring (76) is sleeved around the locking bolt (73) and has two ends. A first end biases the locking bolt (73) while the other end biases a first end (751) of the pawl member (75) in a clockwise direction such that the first end (751) of the pawl member (75) extends into two adjacent ratchet teeth. Under this condition, a second end (752) of the pawl member (75) is located away from the ratchet teeth (45). An important think to note is that the ratchet teeth (45) and the pawl member (75) cooperatively prevent the chuck body (4) from rotating in the clockwise direction.

A sleeve member (8) is provided around the tubular member (7). The sleeve member (8) has a first end from which an annular flange portion (80) extends radially and inwardly therefrom. A second end (81) of the sleeve member (8) is threadedly closed by a lid (82) so as to enclose the chuck body (4) such that only a front portion of the chuck body (4) extends out from the annular flange portion (80) of the sleeve member (8).

Figure 7:
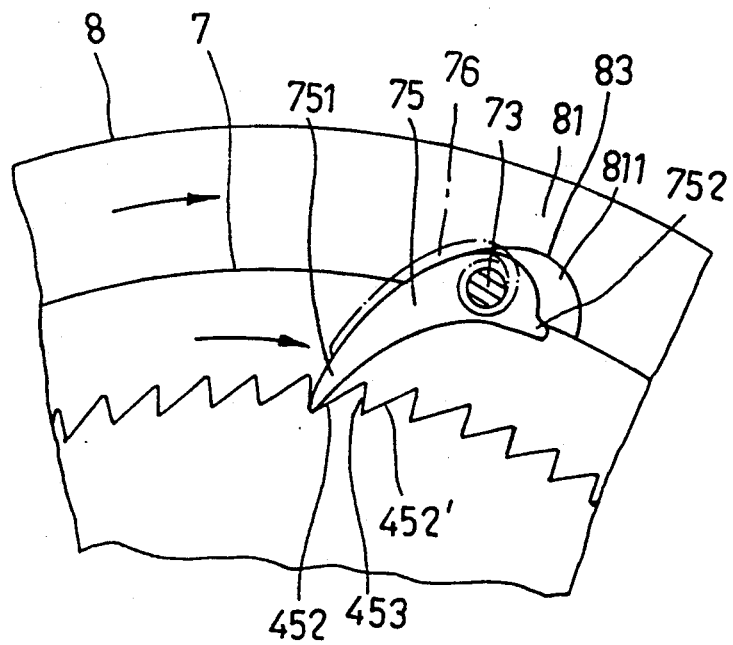
FIG. 7 shows a partially enlarged view of the chuck assembly of the present invention, the chuck assembly being rotated in a first direction for tightening a drill bit which was inserted therein.

Referring to FIG. 7, a notch (811) is formed on an inner surface of the flange portion (80) and receives the pawl member (75) therein. The notch (811) has a curved side wall (83) slightly spaced from the outer periphery of the pawl member (75). The curved side wall (83) includes a first abutting section (not indicated) and a second abutting section opposite to the first abutting section. Each of the ratchet teeth (45) includes a substantially vertically-oriented side (453) and an inclined side (452). When the sleeve member (8) is rotated relative to the chuck body (4) in the clockwise direction, the first abutting section of the curved side wall (83) of the notch (811) abuts and pushes a section of the pawl member (75) adjacent to the first end (751) to pivot in the first direction, as illustrated in FIG. 7. As the pawl member (75) pivots in the first direction, the first end (751) of the pawl member (75) slides on the inclined side (452) of the ratchet tooth (45) and moves to an adjacent ratchet tooth. Thus, the enclosed clamp member (5) rotates together with the tubular member (7) in the clockwise direction. Rotation of the enclosed clamp member (5) in the clockwise direction causes the clamping pieces (6) provided in the respective inclined through hole (43) to move correspondingly interiorly of the axial through bore (41) to clamp the drill bit that was inserted therein.

Figure 8:
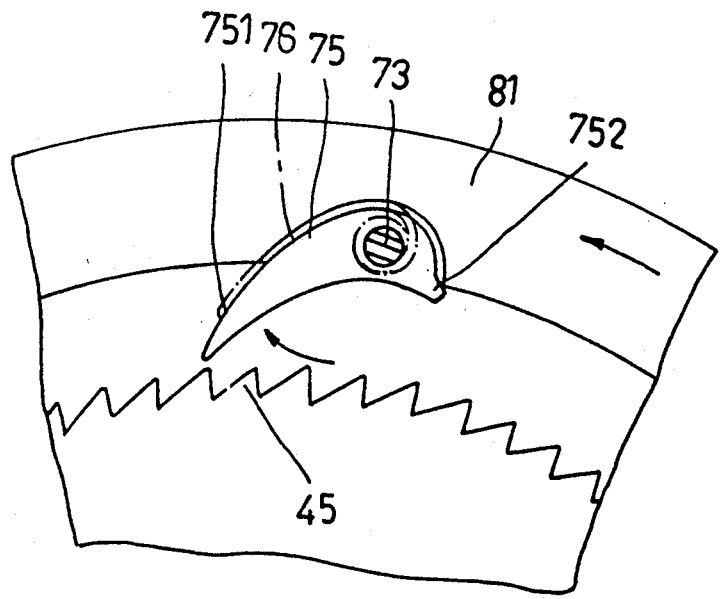
FIG. 8 shows a partially enlarged view of the chuck assembly of the present invention, the chuck assembly being rotated in a second direction opposite to the first direction.
Figure 9:
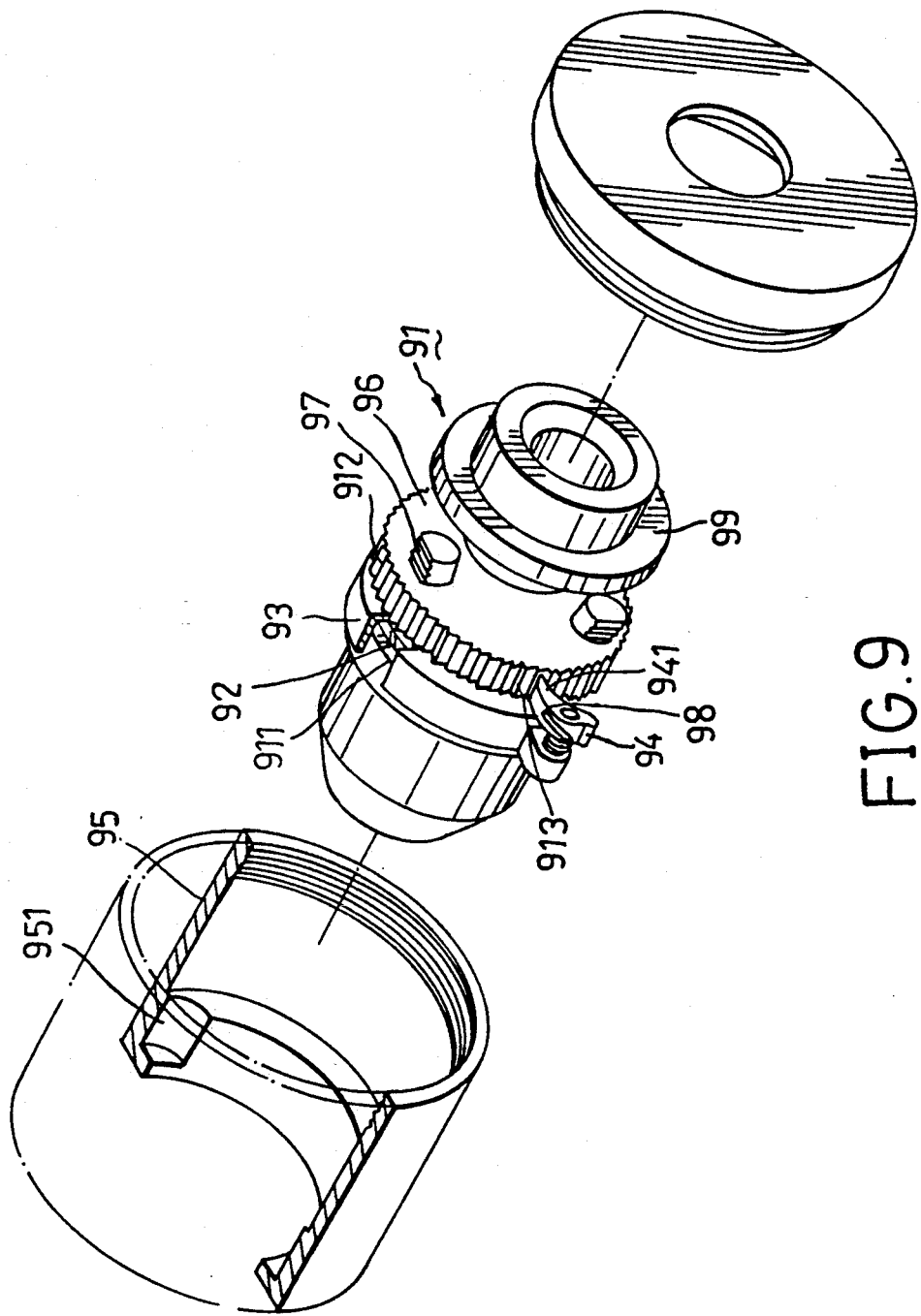
FIG. 9 shows another preferred embodiment of a chuck assembly which is to be incorporated in a drilling apparatus in accordance with the present invention.

Referring to FIG. 8, when the sleeve member (8) is rotated relative to the chuck body (4) in an anti-clockwise direction, the second abutting section of the curved side wall (83) of the notch (811) abuts and pushes a section of the pawl member (75) adjacent to the second end (752) thereof against the biasing action of the spring (76) to pivot the second end of the pawl member (75) in the second direction. As the second end (752) of the pawl member (75) pivots in the second direction, the first end (751) of the pawl member (5) disengages correspondingly form the ratchet teeth (45). The enclosed clamp member (5) rotates together with the tubular member (7) int eh anti-clockwise direction such that the clamping pieces moves exteriorly and rearwardly in the inclined through holes (43) of the chuck body (4). Thus, the drill bit can be removed from the axial bore (41) of the chuck body (4).

In one preferred embodiment of the present invention, the tubular member (93) has a rear end which is integrally formed with the enclosed clamp member (92) so as to retain the enclosed clamp member (92) on the chuck body. The ratchet teeth (912) is formed on the external surface of the outwardly extending flange (96). The pawl member (94) is pivotally provided on the tubular member (93). The spring (98) biases the pawl member (94) so that a first end (941) of the pawl member (94) extends between two adjacent ratchet teeth (912) in a manner similar to that in the previous embodiment. The outwardly extending flange (96) further includes a plurality of threaded through holes which engage threadedly the elongated clamping pieces (97). The chuck body (91) further includes an additional outwardly extending flange (99) adjacent to the flange (96) and which prevents rearward and outward movement of the clamping pieces (97) in the inclined through holes of the chuck body (91). The features and objects of this preferred embodiment are the same as those in the previous embodiment.

In summary, the chuck assembly of the present invention when incorporated in a drilling apparatus has the following advantages:

(1) The ratchet teeth and the pawl member employed int eh chuck assembly of the present invention can prevent the chuck body form rotating in the loosening direction. Thus, when the drilling apparatus vibrates during the drilling operation, the chuck body is prevented from rotating to the loosening direction. The drill bit is therefore firmly held in the chuck body.

(2) The chuck body does not require a chuck key to rotate the chuck body in order to fix the drill bit therein.

While a preferred embodiment has been illustrated and described, it will be apparent that many changes and modifications may be made in the general construction and arrangement of the present invention without departing from the spirit and scope thereof. Therefore, it is desired that the present invention be not limited to the exact disclosure but only to the extend of the appended claims.

I claim:

1. A chuck assembly to be incorporated in a drilling apparatus for holding a shank of a drill bit, said chuck assembly comprising:

a cylindrical chuck body having an axial through bore extending therethrough with a front portion to receive a section of said shank which is inserted therein, an annular recess formed on an external surface of said chuck body and having two opposed side walls, and annular ratchet teeth formed circumferentially on said chuck body adjacent to said annular recess thereof;

a pair of clamping units rotatably provided in said annular recess of said chuck body, said pair of clamping units cooperatively defining an enclosed clamp member with an inner wall that is shaped as a truncated cone and an internal screw thread formed on said inner wall;

said chuck body further having a plurality of through holes, each of said through holes being inclined relative to said axial through bore and passing through said two opposed side walls of said annular recess and extending into said axial through bore of said chuck body;

a plurality of elongated clamping pieces received in respective ones of said inclined through holes, each of said elongated clamping pieces having an abutting side provided with rack teeth that mesh with said internal screw thread of said enclosed clamp member and a front end with a clamping face that passes through a front opposed side wall of said annular recess and that extends into said axial through bore adjacent to said shank; a rear end of said clamping piece passing through and extending out from a rear opposed side wall of said annular recess;

a retaining unit connected securely to said enclosed clamp member for retaining said enclosed clamp member on said chuck body, said retaining unit including an arcuate pawl member with an outer periphery and a spring biasing a first end of said arcuate pawl member in a first direction such that said first end of said pawl member extends between two adjacent ratchet teeth while a second end of said pawl member is located away from said ratchet teeth, said ratchet teeth, said spring and said pawl member cooperatively preventing said chuck body from rotating in said first direction;

a tubular sleeve member sleeved on said retaining unit and having a front end form which an annular flange extends radially and inwardly, said front portion of said chuck body extending out through said annular flange of said tubular sleeve member, said annular flange having an inner face on which a notch is formed to receive said pawl member therein, said notch having a curved side wall with a first abutting section and a second abutting section opposed to said first abutting section;

when said tubular sleeve member is rotated relative to said chuck body in said first direction, said first abutting section abutting a section of said pawl member adjacent to said first end thereof and pushing said first end of said pawl member to slide from a first one of said ratchet teeth to an adjacent one of said ratchet teeth, said enclosed clamped member rotating with said retaining unit in said first direction thereby moving correspondingly said clamping faces of said elongated clamping pieces toward one another in said axial bore of said chuck body; and when said tubular sleeve member is rotated in a second direction opposite to said first direction, said second abutting section abutting and pushing a section of said pawl member adjacent to said second end thereof pivoting said second end of said pawl member against biasing action force of said spring in said second direction such that said first end of said pawl member disengages from said ratchet teeth, said enclosed clamp member rotating together with said retaining unit in said second direction thereby moving said clamping faces of said clamping pieces away from one another in said axial bore of said chuck body.

2. A chuck assembly as defined in claim 1, wherein said chuck body further includes an outwardly extending flange formed thereon between said annular recess and a rear portion of said chuck body for limiting outward and rearward movement of said elongated clamping pieces in said inclined holes of said chuck body.

* * * * *